United States Patent [19]

Watanabe

[11] Patent Number: 4,606,872
[45] Date of Patent: Aug. 19, 1986

[54] METHOD FOR SPINNING CARBON FIBERS

[75] Inventor: Masami Watanabe, Tokyo, Japan

[73] Assignee: Kashima Oil Company, Tokyo, Japan

[21] Appl. No.: 678,747

[22] Filed: Dec. 6, 1984

Related U.S. Application Data

[63] Continuation-in-part of Ser. No. 577,414, Dec. 16, 1983, abandoned.

[30] Foreign Application Priority Data

Mar. 9, 1983 [JP] Japan .................................. 58-37311

[51] Int. Cl.$^4$ .............................................. B29C 47/86
[52] U.S. Cl. .................................... 264/29.2; 208/40;
264/29.6; 264/85; 264/169; 425/72 S
[58] Field of Search .............. 264/169, 29.2, 85, 29.6;
425/72 S; 208/40

[56] References Cited

U.S. PATENT DOCUMENTS

| | | | |
|---|---|---|---|
| 2,252,689 | 8/1941 | Bradshaw | 425/72 S |
| 3,129,272 | 4/1964 | Ferrier et al. | 425/72 S |
| 3,398,429 | 8/1968 | Dickson, III | 425/72 S |
| 3,761,559 | 9/1973 | Heckrotte et al. | 425/72 S |
| 3,814,559 | 6/1974 | Akers et al. | 425/72 S |
| 3,907,957 | 9/1975 | Shaffer | 264/176 F |
| 3,976,729 | 8/1976 | Lewis et al. | 264/176 F |
| 4,124,666 | 11/1978 | Wilhelm et al. | 264/176 F |
| 4,138,525 | 2/1979 | Schulz | 264/176 F |
| 4,301,135 | 11/1981 | Nazem et al. | 264/176 F |
| 4,331,620 | 5/1982 | Diefendorf et al. | 264/176 F |

FOREIGN PATENT DOCUMENTS 53-9291  4/1978  Japan ................................ 264/176 F Primary Examiner—Jeffery Thurlow
Attorney, Agent, or Firm—Armstrong, Nikaido, Marmelstein & Kubovcik

[57] ABSTRACT

A method for spinning filament yarns of high strength, high modulus carbon fibers is provided by way of a melt-spinning process in which a heated inert gas or a non-oxidative gas such as hydrocarbons of small C-numbers is injected steadily onto the surfaces of spinning nozzles to stabilize and ease the melt-spinning.

2 Claims, 1 Drawing Figure

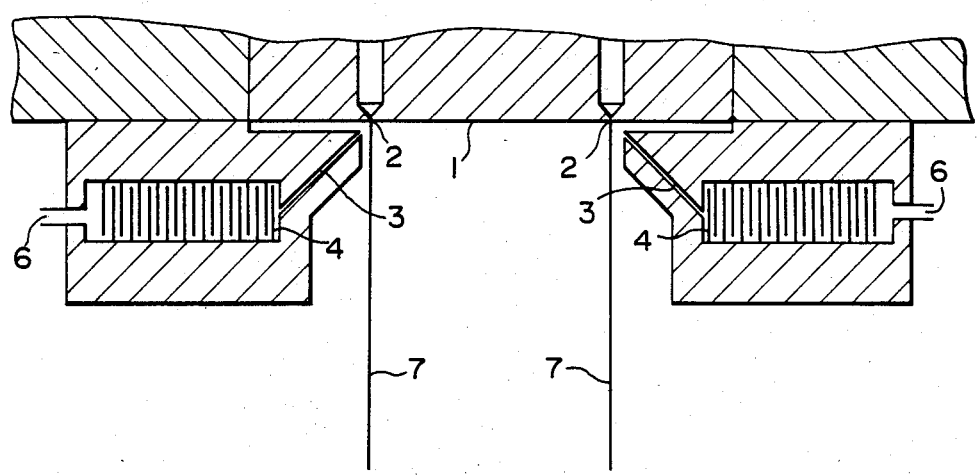

METHOD FOR SPINNING CARBON FIBERS

This application is a continuation-in-part of U.S. Ser. No. 577,414, filed Dec. 16, 1983 and now abandoned.

BACKGROUND OF THE INVENTION

1. Field of the Invention

This invention relates to a method for producing filament yarns of high strength, high modulus carbon fibers. More particularly, it relates to a melt-spinning process of filament yarns of high strength, high modulus carbon fibers in which a heated inert gas or a non-oxidative gas is fed steadily on the surfaces of spinning nozzles to stabilize and ease the melt-spinning.

2. Description of the Prior Art

As the result of recent rapid growth of industries for manufacturing aircrafts, motor vehicles and other transport, a demand for materials prepared by a combinaton of special materials as a material necessary to these industries capable of exhibiting remarkable characteristics because of the superiority of some of their physical properties is ever increasing. Particularly, the demand for the advent of inexpensive materials provided with high strength and high modulus together with lightness of weight is great. However, since the material which satisfies the above-mentioned demand cannot be supplied in a stabilized manner according to the present status of art, research works relative to composite articles (reinforced resins) which meet the above-mentioned requirement are prevailing.

As one of the most promising material to be used as reinforced resin, there can be mentioned high strength high modulus carbon fibers. These materials have appeared from about the time when the rapid growth of the above-mentioned industry just started. When the carbon fibers are combined with a resin, it is possible to produce reinforced resins capable of exhibiting characteristic feature unparalleled in the past. To be regretful enough, however, in spite of the high strength and high modulus of the carbon fibers for the above-mentioned reinforced resins capable of exhibiting extremely notable characteristic feature, the application fields of these fibers have not expanded. The cause of this fact, as explained later, lies in the higher production cost.

It is well known that the material for high strength, high modulus carbon fibers which are commercially available are mostly polyacrylonitrile fibers produced by a special production process and a special spinning process but these acrylonitrile fibers are not only expensive as a precursor of carbon fibers but also the production yield thereof from the precursor is as low as less than 45%. These facts complicate the treatment steps and enlarge production facilities for producing superior carbon fibers, resulting in the increasing production cost of the ultimate products of carbon fibers. The production cost of high strength, high modulus carbon fibers of the ultimate product is further increased by the treatment cost, etc. of hydrocyanic acid by-produced at the time of carbonization treatment.

As for one method for producing high strength, high modulus carbon fibers at a low cost, there are descriptions in the official gazettes of Japanese patent publications No. 1810 (1979) issued to Union Carbide Corporation, and it is a well known fact that mesophase-containing pitches are extremely superior raw material as raw materials for filament yarns of high strength, high modulus carbon fibers. For pitches as raw materials of high strength, high modulus carbon fibers, the content of mesophase and the physical properties of mesophase itself naturally give large influence upon the physical properties of carbon fibers. The higher the mesophase content and the better the quality of mesophase, the greater the improvement of the physical properties of carbon fibers. Namely, for producing high strength, high modulus filament yarns of carbon fibers having superior quality, the purity of mesophase and uniformity of its quality are indispensable condition. However, as a matter of fact, it is difficult at the present status of art to improve the purity and quality of mesophase necessary for producing superior filament yarns of high strength, high modulus carbon fibers to satisfactory extent.

The inventor of the present invention has found that extremely superior filament yarns of high strength, high modulus carbon fibers can be produced by subjecting petroleum-origin or tar-origin pitch which is a residual carbonaceous material produced as a by-product of catalytic cracking (FCC) of vacuum gas oil, to heat treatment at a heating temperature of 360° C. to 420° C. while blowing therein a non-oxidative gas such as hydrocarbons of small carbon numbers to produce a mesophase-containing pitch, subjecting the resultant pitch to heat aging at a heat treatment condition entirely different from that at the time of mesophase preparation, separating mesophase (easily confirmable by using a polarization microscope) by utilizing the difference of physical properties (e.g. specific gravity or viscosity), subjecting the resultant mesophase, as a raw material, to melt spinning, followed by thermosetting and carbonization. However, even the above-mentioned mesophase, which is separated by utilizing only the difference of physical properties (e.g. viscosity or specific gravity) is not accurately uniform in qualities (e.g. molecular weight, chemical structure and other physical properties) depending upon the difference of crude oil as a raw material of petroleum-origin pitch or kind of coal as a raw material of tar-origin pitch. There are Q.I. mesophase (insoluble in quinoline at 80° C.) and Q.S. (measured by extraction with quinoline in a soxhlet apparatus at 80° C.) in mesophase. Even in case of melt-spinning of mesophase, middle or lower molecular weight compounds in mesophase adjere to spinning nozzles, turn by heat to thermoset material due to contact with air, and gaseous components liberated from the spinning nozzles and raw filaments stain the spinning nozzles. When the contamination is built up, spinning of raw filaments becomes unstable, causing frequent breakage of filaments which gives extremely harmful effect on qualities and production.

It is an object of the present invention to provide a method for producing filaments yarns of high strength, high modulus carbon fibers in which the above-mentioned drawbacks of the conventional art have been overcome according to the method of the present invention.

SUMMARY OF THE INVENTION

According to the present invention, when residual carbonaceous material of petroleum-origin or coal tar-origin, produced as a by-product of catalytic cracking (FCC) of vacuum gas oil is subjected to heat-treatment to produce a pitch containing mesophase (measured by a polarization microscope) and a mesophase is separated from the pitch by utilizing the difference of physical properties (e.g. viscosity) and used as a raw material for producing raw filament yarns by way of melt spinning process, an inert gas or a non-oxidative gas of hydrocarbon of low C numbers, heated at a definite temperature is steadily fed to the surfaces of spinning nozzles to control the contamination of the surfaces of the spinning nozzles of a spinning machine and at the same time the temperature of the surfaces of the nozzles is maintained at a predetermined temperature to stabilize the raw filament yarns extruded and to carry out smooth spinning without suffering from breakage and unevenness of filaments.

PREFERRED EMBODIMENTS OF THE INVENTION

As above-mentioned, the control of contamination of nozzles is extremely important problem in the melt-spinning of carbon fibers. The temperature of gas to be fed on the surfaces of spinning nozzles varies according to the volume of gas to be fed per unit time, numbers and pitches of spinning holes in spinning nozzles and amount of production of raw filaments per unit time, etc. in the method of the present invention and by feeding an inert gas or a non-oxidative gas, such as hydrocarbon gases of small carbon numbers maintained at a predetermined temperature which is lower than spinning temperature by 30°~60° C. directly onto the surface of nozzles steadily while keeping a fixed angle of blowing or injection relative to the line of fall of filaments to maintain the surfaces of spinning nozzle at a predetermined temperature and at the same time to immediately drive off lower molecular weight compounds liberated from the mesophase and gaseous component generated from raw filament yarns, to prevent the surfaces of spinning nozzles from being stained and also to prevent the raw filament yarns extruded from spinning nozzles from being turned directly to infusible matter (thermoset) on the surfaces of spinning nozzles and thereby effect smooth and steady melt spinning.

As for the angle of blowing or injection, it is in the range of 30°~80° preferably 30°~60°, relative to the fall of filaments but the outlet of gas should be kept apart from the outlet hole of nozzle by 2~20 mm, preferably about 5 mm and the speed of injected gas should be in the range of 5~70 cm/sec. preferably 10~50 cm/sec. (normal condition)

The temperature of gas sent steadily onto the surfaces of spinning nozzles is determined as above-mentioned by the conditions of melt-spinning but it should be in the range lower than spinning temperature by 30°~60° C. Spinning temperature of mesophase pitch is carried out in the range of 250°~400° C. preferably 300°~330° C. As for inert gas used, nitrogen, hydrogen and argon are mentioned, and as for non-oxidative gas, methane, ethane, propane, and other lower boiling point hydrocarbons etc. are illustrated, but as most easily usable gas, nitrogen and argon can be mentioned. The use of oxygen-containing gas such as air is harmful.

The invention entitled "method for producing mesophase containing pitch by using carrier gas" filed by Masami Watanabe on June 24, 1983 (U.S. Ser. No. 507585, now U.S. Pat. No. 4,487,685) and "Improved method for producing mesophase pitch" filed also by Masami Watanabe on June 24, 1983 (U.S. Ser. No. 507586, now U.S. Pat. No. 4,529,499) have been utilized partly in the present invention and the descriptions of these inventions are incorporated in the description of the present appliction by reference.

Following examples are offered by way of illustration and not by way of limitation.

EXAMPLE 1

A precursor pitch (having a softening point of 67° C. corresponding to R & B) was prepared by subjecting destillate fractions of petroleum pitch of residual carbonaceous material produced as a by-product of catalytic cracking of vacuum gas oil (FCC) (an initial fraction of 404° C. and a final fraction of lower than 560° C.) to heat treatment at a temperature of 400° C. for 2 hours while blowing therein methane gas as a non-oxidative gas. A pitch containing 45.2% mesophase was prepared by subjecting the precursor pitch to heat treatment at a temperature of 400° C. for 6 hours with stirring while blowing therein methane gas under normal pressures. The resulting mesophase containing pitch was subjected to aging treatment under a condition different from the heat treatment. A 100% mesophase was separated by utilizing the difference of viscosity, and melt spinning was carried out under the following spinning conditions using the 100% mesophase:

Spinning temperature, 330° C.; diameter of spinning nozzles, 0.3 mm; spinning velocity, 180 m/min.; and No. of spinning holes of a spinning nozzle, 100. Angle of injection of nitrogen 45° to direction of falling filaments.

The contamination of the surfaces of the spinning nozzles can be sufficiently controlled by sending nitrogen at a temperature of 50° C. lower than spinning temperature steadily and directly onto the surfaces of the spinning nozzles at a rate of 20 cm/sec. Thus smooth and stabilized spinning which was free of disturbance to filament path by lower molecular weight compounds or other components in the raw material for spinning, could be continued for a long period of time and filament yarns having fixed quality could be produced.

REFERENTIAL EXAMPLE

When the 100% mesophase, as a raw material for spinning, prepared according to a process of Example 1 was subjected to spinning under the spinning condition the same as that of Example 1, but without injection of nitrogen breakage of filaments occurred approximately every 15 minutes.

Breakage of filaments also occurred if the angle of injection of nitrogen was outside the range of 30°~80° relative to the fall of the filament.

The method of the present invention will be carried out conveniently by using slits for blowing an inert gas or a non-oxidative gas of lower boiling point hydrocarbon directly onto the lower surface of nozzle plate at an angle in the range of 30°-80° preferably 30°-60° relative to the falling filaments as shown in FIG. 1.

BRIEF DESCRIPTION OF THE DRAWING

FIG. 1 shows a schematic vertical cross-sectional view of gas blowing slits which are arranged near spinning nozzles.

In FIG. 1, 1 is a nozzle plate, 2 is a nozzle outlet hole, 3 is a slit for flowing the gas, 4 is a fin for rectifying flow of gas or conducting heat to gas, 6 is an inlet for gas and 7 is extruded filaments.

What is claimed is:

1. A method for spinning carbon fibers by subjecting petroleum-origin or coal-tar-origin pitch to heat-treatment to obtain a mesophase-containing pitch, separating a mesophase from the resulting pitch and subjecting the separated mesophase to the melt-spinning, which comprises injecting an inert gas or a non-oxidative gas of lower boiling point hydrocarbons, which is heated up to a predetermined temperature which is about 30°~60° C. lower than the spinning temperature, directly onto the surfaces of spinning nozzles steadily at a spinning temperature of molten pitch of 250° C. to 400° C. to maintain the temperature of the surfaces of spinning nozzles at a predetermined temperature while keeping an angle of injection of gas of 30°~80° relative to falling spun filaments and an injection speed of gas in the range of 5~70 cm/sec, thereby preventing the raw filament yarns extruded from the spinning nozzles from immediately turning to infusible thermosetting matter, and immediately driving gaseous components, which are vaporized from the spinning nozzles and raw filament yarns, off the surfaces of spinning nozzles to control the contamination of the surfaces of spinning nozzles.

2. A method for spinning carbon fibers according to claim 1, wherein an injection outlet of gas is kept apart from the outlet hole of nozzle by 2~20 mm.

* * * * *